(12) United States Patent
Pratt et al.

(10) Patent No.: US 7,711,601 B2
(45) Date of Patent: May 4, 2010

(54) AUDIO/VIDEO AUTOMATED PAYMENT FACILITY

(76) Inventors: Mark Pratt, 11 Rock Haven La., Signal Mountain, TN (US) 37377; David Harpold, 2251 Grand Teton Blvd., Melbourne, FL (US) 32935

(*) Notice: Subject to any disclaimer, the term of this patent is extended or adjusted under 35 U.S.C. 154(b) by 1854 days.

(21) Appl. No.: 09/903,001

(22) Filed: Jul. 11, 2001

(65) Prior Publication Data

US 2003/0014316 A1  Jan. 16, 2003

(51) Int. Cl.
*G06G 1/12* (2006.01)

(52) U.S. Cl. ............................ 705/21; 705/26; 705/13; 705/39; 705/418; 358/93

(58) Field of Classification Search ................. 705/16, 705/17, 18, 20–22, 24, 25, 418, 26, 13, 15; 340/932.2; 358/93
See application file for complete search history.

(56) References Cited

U.S. PATENT DOCUMENTS

| | | | |
|---|---|---|---|
| 4,603,390 A | | 7/1986 | Mehdipour et al. |
| 4,703,164 A | | 10/1987 | von Ballmoos |
| 5,034,739 A | | 7/1991 | Gruhl |
| 5,168,354 A | * | 12/1992 | Martinez et al. ............ 348/150 |
| 5,482,139 A | | 1/1996 | Rivalto |
| 5,614,892 A | | 3/1997 | Ward, II et al. |
| 5,648,906 A | | 7/1997 | Amirpanahi |
| 5,710,557 A | | 1/1998 | Schuette |
| 5,737,710 A | | 4/1998 | Anthonyson |
| 5,745,052 A | | 4/1998 | Matsauyama et al. |
| 5,751,973 A | | 5/1998 | Hassett |
| 5,770,845 A | | 6/1998 | Hjelmvik |
| 5,838,314 A | * | 11/1998 | Neel et al. ...................... 725/8 |
| 5,845,268 A | | 12/1998 | Moore |
| 5,905,247 A | | 5/1999 | Ilen |
| 5,940,481 A | | 8/1999 | Zeitman |
| 6,032,126 A | | 2/2000 | Kaehler |
| 6,188,328 B1 | * | 2/2001 | Ho ........................... 340/932.2 |
| 6,329,930 B1 | * | 12/2001 | Parsadayan ................. 340/933 |
| 6,340,935 B1 | * | 1/2002 | Hall ......................... 340/932.2 |
| 6,505,774 B1 | * | 1/2003 | Fulcher et al. .............. 235/381 |
| 6,564,380 B1 | * | 5/2003 | Murphy ...................... 725/86 |
| 6,865,539 B1 | * | 3/2005 | Pugliese, III ................. 705/5 |
| 2001/0001321 A1 | * | 5/2001 | Resnick et al. ............... 705/17 |

(Continued)

OTHER PUBLICATIONS

HID Corporation Press Release, Mar. 14, 2000, HID Intoduces Parking Area Active Tag.*

*Primary Examiner*—Vanel Frenel
(74) *Attorney, Agent, or Firm*—Barnes & Thornburg

(57) ABSTRACT

A central monitoring station is linked to a plurality of remote terminals, such as payment terminals at a plurality of parking facilities. The central monitoring station and each remote terminal includes a two-way communication system in the form of a video camera and display, and audio speaker and microphone. The station and remote terminals are preferably linked through an Ethernet or Internet connection, although a hard-wired connection is also contemplated. The two-way communication system can be used by a customer at the remote terminal to achieve direct human interaction with an attendant at the remote central station to address problems occurring at the terminal. The communication system can also allow the attendant to manipulate the processor of each remote terminal to collect data, troubleshoot or override the function of the terminal.

13 Claims, 2 Drawing Sheets

U.S. PATENT DOCUMENTS

| | | | |
|---|---|---|---|
| 2002/0032601 A1* | 3/2002 | Admasu et al. | 705/13 |
| 2002/0087413 A1* | 7/2002 | Mahaffy et al. | 705/16 |
| 2003/0004792 A1* | 1/2003 | Townzen et al. | 705/13 |
| 2003/0032601 A1* | 2/2003 | Kreuter et al. | 514/21 |

* cited by examiner

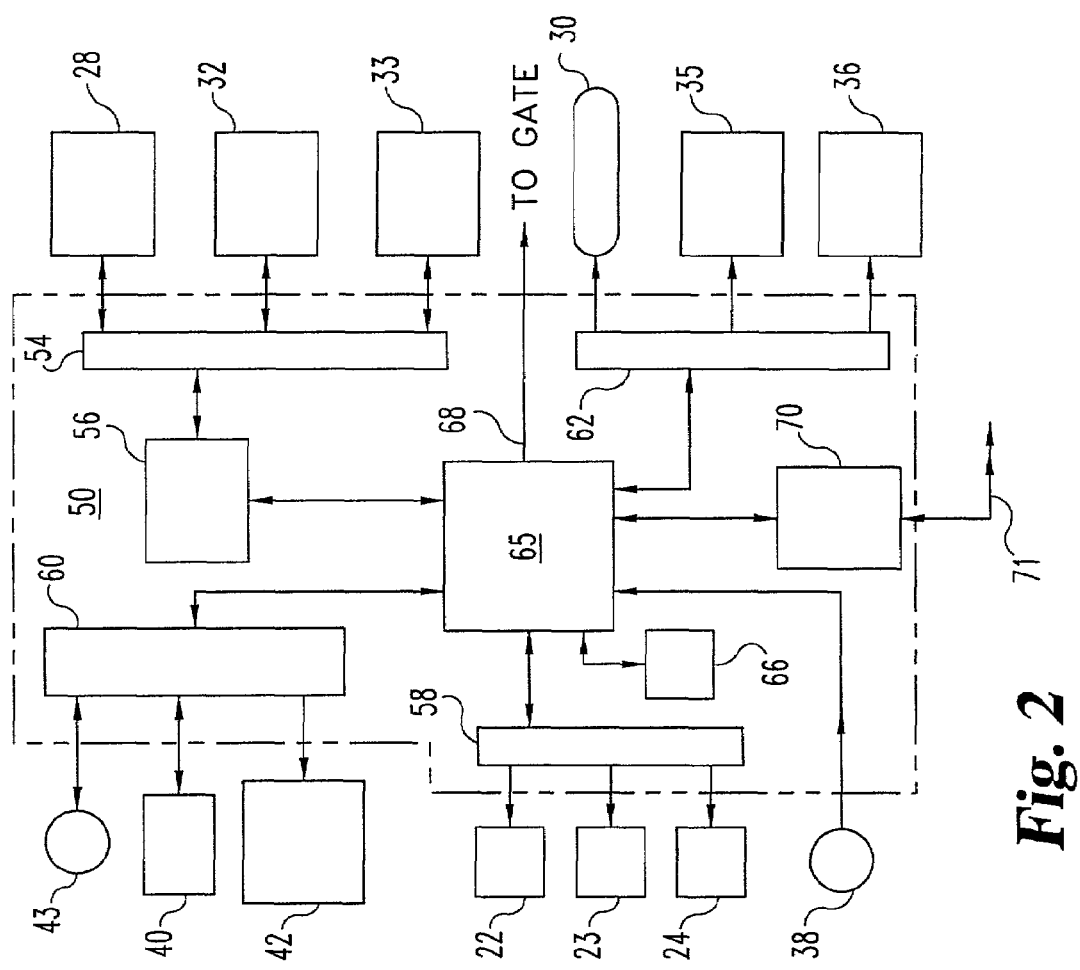
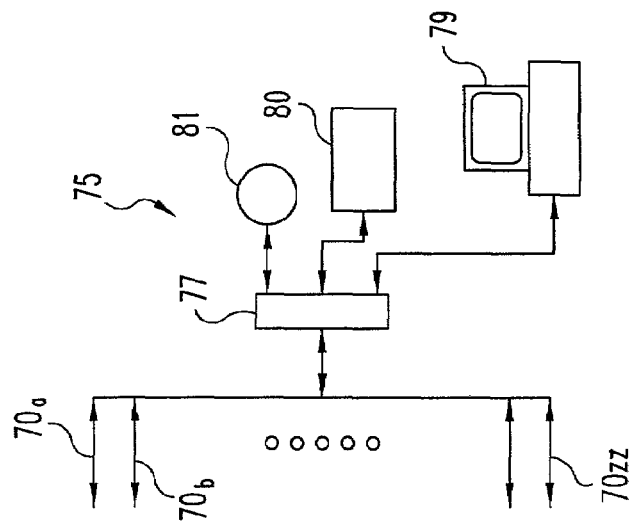

AUDIO/VIDEO AUTOMATED PAYMENT FACILITY

BACKGROUND OF THE INVENTION

The present invention relates to the field of automated payment facilities, such as exit facilities for parking garage or parking lot applications.

Exit facilities for parking lots and parking garages are well known. In the typical exit facility, an exit gate bars egress from the parking area until payment has been registered. In a typical parking facility, a live attendant sits within a tollbooth at the exit. The attendant calculates the value of parking, receives payment and activates the gate to permit a vehicle to pass.

In recent years, automation has reached the exit facility for parking lots and parking garages. In the automated system, a vehicle operator pays the cost of a parking validation ticket at a remote site. The ticket itself is encoded to indicate that payment has been received. The vehicle operator then proceeds to the exit facility where the validated ticket is read and registered. When the appropriate payment signal is sensed by the exit equipment, the gate opens allowing egress. One difficulty in facilities of this type is that the payment facility is isolated from the exit facility. In a typical situation, live attendants occupy adjacent booths to take payment in the likely event that the commuter fails to validate his/her parking ticket prior to exit. Thus, while this type of automated facility obtains some of the benefits of the automation, it still does not completely satisfy or achieve the objective of a fully automated system. In fact, in a typical installation, more vehicles pass through the operator attendant booths than the fully automated booth.

One decided advantage of the live parking attendant is the capability of human interaction. Even in these days of automation, many individuals still prefer the human touch, particular when one is paying money. The fully automated systems do not have the capability of providing any human interaction, which often makes these types of systems undesirable in spite of the conveniences that they may otherwise present.

There remains a need for an automated payment facility that combines the benefits of the human attendant with the benefits of the automated system.

SUMMARY OF THE INVENTION

In order to address these needs, the present invention contemplates an automated payment facility that permits human interaction with the walk-up or drive-up customer. In one embodiment, a central monitoring station is linked to a number of remote facilities, such as exit facilities at parking lots or garages. Each exit facility includes means for assessing and receiving a payment amount. For an exit facility in connection with a parking lot, this means includes means for assessing a payment amount that can comprise a ticket reader, a processor for calculating a time duration and associated fee, and a display for displaying the fee amount to the customer. The overall means can also include means for receiving the payment amount, which can further comprise a credit/debit card reader and/or cash acceptor, in addition to software within the processor capable of processing the payment. All of these components can be of known design and can all operate to control an exit gate mechanism as is known in the art.

The present invention contemplates the novel addition of means for providing two-way video and audio communication with the central monitoring facility remote from each payment terminal. In the preferred embodiment, this means comprises a digital video camera, a monitor or video display and an audio speaker and microphone element at both the payment terminal and the central monitoring facility. The communication means can be continuously activated, automatically activated when a customer approaches or access the exit terminal, or on issuance of a help request by the customer through the exit terminal. When activated, the communication means provides for two-way human-to-human interaction between the customer and a remote live attendant.

In one aspect of the invention, this two-way communication feature can allow the customer to speak directly to a live attendant to at least verbally address problems that may have been encountered at the facility. The communication feature can also be used as a security or emergency call capability. In a preferred embodiment, the remote attendant can access the processor of the remote payment terminal to perform a variety of functions. For instance, the attendant can troubleshoot components of the exit facility, determine a proper payment amount, or process payment of the requisite fee. The terminal processor can also be remotely accessed by the central attendant to directly activate the exit facility, such as by raising the exit gate to allow the customer to exit.

The two-way communication feature allows the customer to remain in contact with the remote attendant until the particular transaction is complete. In addition, the feature allows a central monitoring station to be linked to a plurality of remote terminals, such as parking payment and exit facilities. The central monitoring station can include a P/C that is linked to each remote terminal in a variety of ways. Preferably, the link is established through an Ethernet or the Internet, or through a direct communication line, including a land-line or a satellite link.

The P/C allows the remote attendant to access any of the linked payment terminals, either in response to a signal from the terminal itself or at the attendant's own behest. Thus, a single attendant can be available to communicate with several payment terminals, in lieu of the prior approach of manning a payment booth at each facility. A bank of P/C's and associated attendants can work from the central monitoring station to communicate with dozens of remote facilities, providing the human touch to each facility regardless of the location of the central station and the remote facilities.

It is one important object of the present invention to provide human interaction at a remote terminal, such as a payment terminal at a parking facility. Another object is to maintain this direct human interaction with a large number of remote terminals, while minimizing the manpower requirements for providing this service.

One clear benefit achieved by the present invention is that a customer at a remote facility can readily reach a human to help address problems occurring at the facility. Another benefit is that a remote attendant at a central station can monitor and control the remote facility as required.

These and other objects and benefits will become apparent upon consideration of the following written description and accompanying figures.

DESCRIPTION OF THE FIGURES

FIG. 2 is a block diagram of the components of the exit facility shown in FIG. 1.

FIG. 3 is a block diagram of the components of a universally monitored and administered array of exit facilities.

DESCRIPTION OF THE PREFERRED EMBODIMENTS

Figure 1:
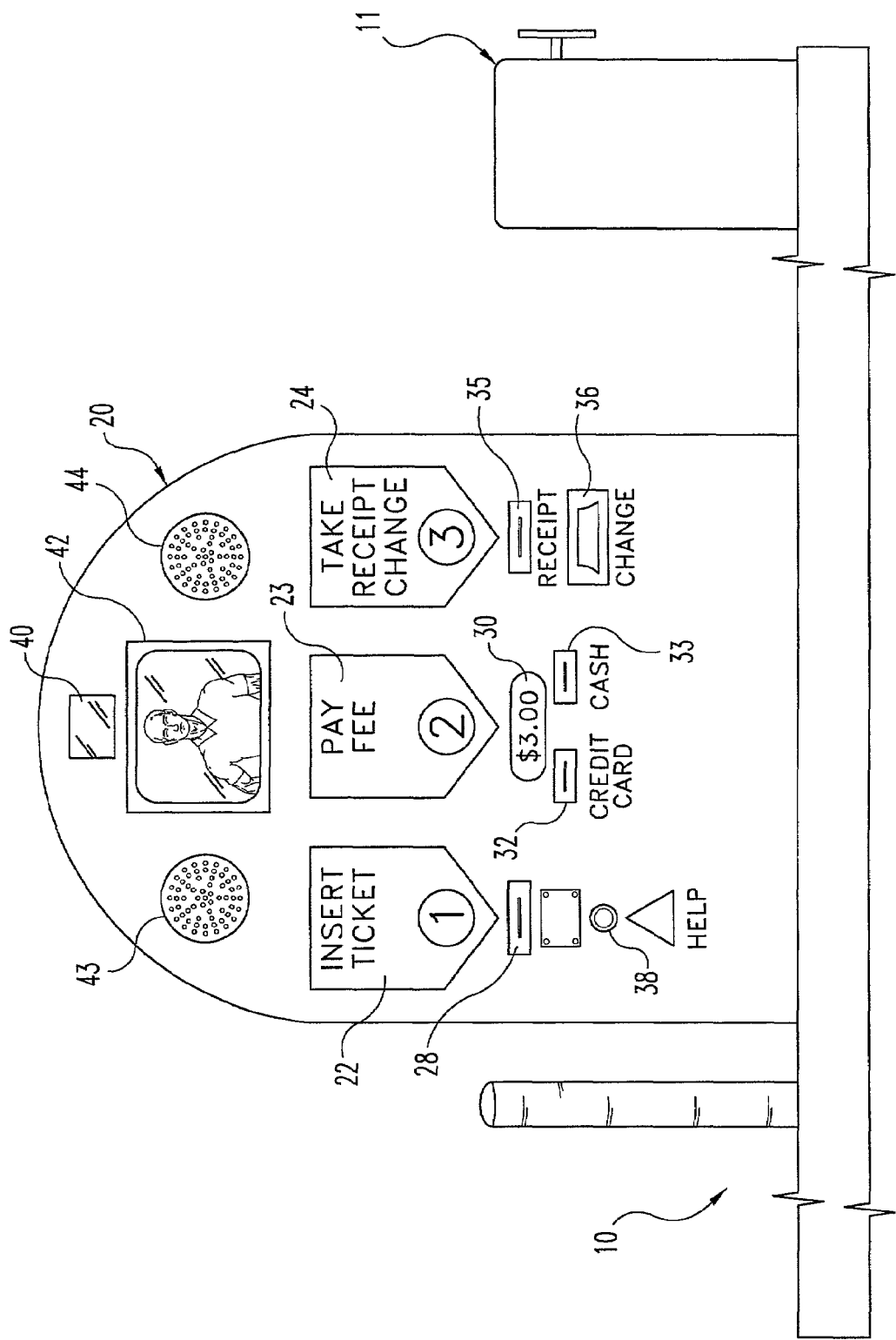
FIG. 1 is a side diagrammatic representation of an exit facility in accordance with one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. The inventions includes any alterations and further modifications in the illustrated devices and described methods and further applications of the principles of the invention which would normally occur to one skilled in the art to which the invention relates.

The present invention contemplates integrating video conferencing capabilities with an automated payment terminal. The following description of the preferred embodiment envisions use of the invention as part of a parking facility. However, it should be understood that other applications of the inventive concepts disclosed herein are contemplated beyond the illustrated embodiment.

In accordance with a preferred embodiment of the invention, an exit facility 10, for a parking garage for example, includes a gate mechanism 11 that restricts egress from the parking structure. A payment terminal 20 is provided that controls the operation of the gate mechanism 11. The payment terminal 20 can remain generally dormant until a vehicle arrives at the exit facility 10. In other words, the electrically powered components of the terminal 20 can be retained in a standby condition or a reduced power condition until the terminal 20 is fully activated. This activation can occur by a pressure switch adjacent the terminal 20, a sensing eye, or by operator interaction with the terminal itself.

In one feature of the preferred embodiment, the payment terminal 20 includes a series of sequential instruction displays 22, 23 and 24. Preferably, each display is back-lighted or illuminated to be readily visible by the driver. In additions most preferably each of the displays 22-24 is illuminated in sequence to indicate the next step to be performed in the payment process.

In the instance in which the payment terminal 20 is activated by the presence of the vehicle, the first display 22 can be illuminated to identify the location in which the vehicle operator inserts the parking ticket. Specifically, the ticket is inserted into a ticket reader 28. The ticket can be of any conventional type, such as Hollerith, scan-stripped or bar-coded, and the reader can be of a known type capable of reading the particular ticket. The payment terminal 20 includes a microprocessor 65 (see FIG. 2) that registers the ticket inserted into the reader 28 and determines the duration at the parking facility and the required fee. It also is envisioned that the ticket reader 28 and the associated software can identify prepaid tickets, user passes, discount cards and other indicia on the ticket to identify a particular payment regime. In some instances, such as in the case of a parking pass, the central processor 65 can be configured to identify the ticket inserted into the reader 28 as providing automatic egress, in which instance, the processor 65 provides a instruction on the gate signal line 68 to raise the gate mechanism 11.

However, in the typical instance, the processor 65 will undertake a calculation to determine the requisite fee. At that point, the display 22 is turned off, and the next display 23 is illuminated. This display identifies the location for payment by the vehicle operator. The required payment amount is shown in the fee display 30, which is again controlled by the central processor 65 in a known manner. In accordance with the most preferred embodiment, two general payment approaches are permitted. In the first, a credit card reader 32 can scan a credit card, debit card, prepaid value card or a validation coupon (such as a validated parking ticket). In the second, a cash acceptor 33 accepts conventional bills. A coin acceptance unit can also be incorporated as a payment vehicle. In the event that a credit or debit card is inserted into the reader 32, the central processor 65 can activate known software which performs the necessary credit check to evaluate the validity and credit worthiness of the card to determine whether payment can be accepted through this means. If the card is "rejected", the reader 32 operates to eject the card. The fee display 30 can be altered to provide an additional display indicating that the credit card payment method has been rejected, thereby requiring a cash payment.

Once an appropriate amount of cash payment has been inserted into the cash acceptor 33, or an appropriate credit card 32 has been evaluated by the reader 32, the display 23 is de-energized, and the next display 24 is illuminated. This display identifies the location of the receipt printer 35 in which a paper receipt is produced for the vehicle driver. In addition, if cash is provided at the acceptor 33, the central processor 65 determines whether the inserted cash exceeds the requisite payment amount. In this instance, appropriate change is dispensed through the change dispenser 36.

As thus far described the payment terminal 20 parallels many known "pay on foot" stations, or fully automated payment stations. In accordance with an important feature of the present invention, the payment terminal 20 includes what amounts to a video conferencing capability. Specifically, the terminal 20 includes a digital video camera 40, a monitor or video display 42 and communication speakers/microphones 43 and 44. As described in more detail herein, the payment terminal 20 is remotely connected to a workstation occupied by a human. A video camera transmits an image of the attendant to the payment terminal 20 for display on the monitor 42. Likewise, two-way communication between the attendant and the driver is facilitated by the speakers/microphones 43 and 44. The video camera 40 transmits an image of the person at the payment terminal to provide the live attendant with commensurate human interaction.

In one embodiment, the video and audio interaction features of the payment terminal 20 are constantly activated, or at a minimum activated when the payment terminal 20 is activated. Alternatively, the video conferencing capabilities can be accessed through the help button 38. The terminal 20 can include an easily and clearly identified help button 38 that can be depressed to send a signal from the payment terminal 20 to the remote monitoring station. Depressing the help button 38 can automatically activate the video conferencing equipment, namely, the camera 40, the display 42 and the speaker/microphones 43, 44. Alternatively, the attendant can remotely energize the video conferencing equipment, once from the payment terminal 20.

When the video conferencing component of the payment terminal 20 is activated, the consumer, such as a vehicle driver, can directly interact with the remote-based attendant. At this point, the driver can identify specific problems that are being encountered, such as the ticket reader 28 is failing to read the parking ticket, the cash acceptor 33 is not accepting the cash, the credit card reader is rejecting the credit/debit card, no receipt has been generated, or no change has been received. Moreover, and perhaps most importantly, the activation of the video conferencing can be used as a safety or alert feature.

The attendant can have a varying range of control over the components of the payment terminal and can remotely access the central processor 65 of the payment terminal 20. For instance, the remote attendant can execute a diagnostic routine that determines whether any of the electronic or mechanical components of the terminal has malfunctioned. The live attendant can help resolve credit/debit card issues. In case of a failure of the ticket reader, the attendant can verbally receive the length of time that the vehicle has been parked directly from the vehicle operator (of course, relying upon the "honor system" in this regard). The remote attendant can remotely calculate the appropriate fee and can activate the fee display and associated software within the central processor 65. Finally, but not exclusively, the remote operator can initiate a signal on the gate signal line 68 to open the gate mechanism 11 depending upon the outcome of the video conferencing.

In order to accomplish this human interaction through video conferencing the payment terminal 20 includes a remote processor unit 50. The remote processor 50 is preferably a PC-based system with some limited computing power and limited memory. Most significantly, the remote processing unit 50 is provided with some means for communicating with a remote-based attendant.

In the preferred embodiment, the remote processor unit 50 includes an input control module 54 that communicates with the ticket reader 28, credit card reader 32 and cash acceptor 33. The input control module 54 can provide two-way communication with each of the various readers to receive digital signals indicative of data contained on the ticket and send control signals to the reader/acceptor electronics. The input control model 54 can communicate with a fee calculation module 56 which can calculate the appropriate parking fee based on validation of the parking ticket through the reader 28, and then ultimately determine whether the fee has been paid. The fee calculation module 56 can also determine whether the fee has been overpaid by payment through the cash acceptor 33 and determine the amount of change to be dispensed through the change dispenser 36. The fee calculation module 56 communicates with the central processor 65, which can then appropriately control other components of the terminal 20.

The remote processor unit 50 also includes a display control module 58, which is connected to the sequential displays 22-24. The display control module 58 can include a switching network to turn on and off the illumination for each of the displays, based upon signals received from the central processor 65.

A communication control module 60 is provided to accomplish the video conferencing features. This module is connected to the video camera 40, the monitor/video display 42 and the speaker/microphones 43, 44. The display control module 58 also communicates with and is controlled by the central processor 65 to transmit and receive audio and video signals.

The remote processor unit 50 also includes an output control module 62 that controls the display on the fee display 30, the generation of a receipt through the receipt printer 35, and the discharge of change through change dispenser 36. Again, the output control module 62 is controlled by signals from the central processor 65. Moreover, the central processor 65 provides a signal on gate signal line 68 to the gate mechanism in 11 instructing the mechanism to raise or lower as a function of the activity occurring at the payment terminal 20.

It is understood that each of the basic modules can be readily implemented in hardware, electronics and software or a combination thereof, which is all within the skill of the ordinary artisan in this field. Preferably, as indicated above, the remote processor unit 50 is a personal computer, which can then include a number of software routines to perform the various modular functions. In addition, the processor unit 50 can include a memory 66 associated with the central processor 65. This memory can be continuously accessed by the central processor 65 to obtain pricing information. In addition, the memory 66 can store information from each payment transaction. This data can then be downloaded through the payment terminal 20, or more preferably periodically transmitted to a remote monitoring station for evaluation. The data stored within the memory and/or transmitted to the central monitoring station can include the number of vehicles passing through the exit facility 10, the average stay of a particular vehicle in the facility, the number of malfunctions or errors occurring, and other information indicative of the performance of the payment terminal 20.

In order to effect the communication from the payment terminal 20 to a remote monitoring facility 75, the remote processor 50 also includes a communication module 70 that can provide immediate and direct communication through a data link 71, as depicted in FIG. 3. In one embodiment, the communication module can be a hard-wired link to a remote location. For instance, in a building that includes a parking facility, the remote monitoring personnel can be the building attendant.

However, most preferably, the datalink 71 is accomplished through an Internet or Ethernet connection. In this instance, the communication module 70 can include a modem capable of making a remote 75 or dial-up connection. Thus, a remote or central monitoring station can be located virtually any place in the world and still provide the video conferencing and human interaction features of the present invention. Referring to FIG. 3, a number of communication modules $70_A$-$70_{zz}$, corresponding to a like member of widely dispersed payment terminals, are shown linked to a central monitoring station 75. The monitoring station includes its own communication module 77 that can administer the flow of data from each of the independent and remote payment terminals to and from remote station. For instance, the module 77 can include a communication modem and software to avoid conflicts and data crashing.

The central monitoring station 75 can include a personal computer 79 with a video display, a video camera 80, and a speaker/microphone system 81, all similar to the like components found on the payment terminal 20. Thus, the video camera transmits an image of the human attendant at the remote monitoring station 75, while the speaker/microphone accomplishes two-way communication. The remote attendant can perform the various monitoring and communication functions described above through the PC 79.

In a most preferred embodiment, the PC 79 includes software that permits multiple displays on the PC monitor as audio/video data is received from individual ones of the payment terminals 20. Alternatively, the display seen by the remote attendant can be scrolled from payment terminal to payment terminal. Of course, if the attendant were working with a driver at one payment terminal, request from help from another payment terminal would ordinarily be delayed. Most preferably, the central monitoring station can include a number attendants, each jointly monitoring all of the remote payment terminals affiliated with that monitoring station the instance where multiple help requests are incoming to the monitoring station 75, the requests can be conveyed to successively available attendants.

The local monitoring/video display 42 at the payment terminal 20 can receive and display other images when not being used to communicate with the remote station. For instance, the monitor can display advertisements, or describe events occurring in the city, provide weather or traffic information, or virtually any kind of information that is desired. The same Ethernet or Internet link can be used to provide a wide range of video display when the attendant is busy or when an attendant is not required.

In the preferred illustrated embodiment, the inventive payment facility finds great utility in connection with a vehicle parking facility. The same inventive concepts can be used with "pay-on-foot" stations, street-side parking meters, entry facilities such as for a building, museum, exhibit or concert, and the like. The video conferencing capability not only adds a human touch, it also provides access to a decision-marker who can field questions and provide immediate solutions.

In the most preferred embodiment, the payment facilities are linked to the central monitoring facility using an internet-type connection. Each payment facility, or at a minimum each video camera, can be IP addressable. Similar technology is incorporated into videoware provided by CUseeME Networks, Inc., which videoware could be readily adapted for use with the present inventive system.

Each payment facility can include its own payment processing capability, as described above. An independent dial-up type connection can be provided as is known in the art. Alternatively, credit/debit card payments can be processed through the central facility.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

What is claimed is:

1. An automated payment system for a parking facility, comprising:
    an exit gate operable to control egress from the parking facility; and
    a payment terminal including:
        means for assessing a payment amount;
        means for receiving the payment amount;
        means for opening said exit gate upon receipt of the payment amount; and
    means for providing two-way video and audio communication with a monitoring facility remote from said payment terminal enabling two-way audio and video interaction between a customer at the payment terminal and a live attendant at the monitoring facility.

2. The automated payment system according to claim 1, wherein said means for providing two-way video and audio communication includes an Ethernet or Internet link between said payment terminal and the monitoring facility.

3. The automated payment system according to claim 2, wherein said means for providing two-way video and audio communication includes an IP-addressable video camera.

4. The automated payment system according to claim 1, further comprising:
    a processor at said payment terminal operable to control said means for assessing and said means for receiving; and
    a data link between said processor and the monitoring facility to permit remote control of said processor.

5. An automated payment system for a plurality of parking facilities comprising:
    a central monitoring facility;
    a plurality of exit facilities remote from said central monitoring facility, each controlling egress from a corresponding one of the plurality of parking facilities;
    a payment terminal at each of said plurality of exit facilities, each having means for assessing and receiving payment; and
    means for providing two-way video and audio communication between said central monitoring facility and said payment terminal at each of said plurality of exit facilities establishing live audio and video interaction between a customer at the payment terminal and an attendant at the monitoring facility.

6. The automated payment system according to claim 5, wherein said means for providing two-way video and audio communication includes an Ethernet or Internet link between said payment terminal and the monitoring facility.

7. The automated payment system according to claim 6, wherein said means for providing two-way video and audio communication includes an IP-addressable video camera.

8. The automated payment system according to claim 5, further comprising:
    a processor at said payment terminal operable to control said means for assessing and said means for receiving; and
    a data link between said processor and the monitoring facility to permit remote control of said processor.

9. The automated payment system according to claim 8, further comprising:
    a central processor at said central monitoring facility connected to said processor at said payment terminal through said data link and controllable at said central monitoring facility to control said processor at said payment terminal.

10. An automated payment system for a facility, comprising:
    an apparatus for calculating a payment amount;
    an apparatus for receiving the payment amount;
    a gate apparatus operable to control access to the facility in response to receipt of the payment amount; and
    a two-way video and audio communication system linking the automated payment system with a monitoring facility remote from the automated payment facility including a video camera, a video display, a speaker and microphone at the automated payment system and including a video camera, a video display, a speaker and microphone at the monitoring facility for live audio and video communication.

11. The automated payment system according to claim 10, wherein said two-way video and audio communication system includes an Ethernet or Internet link between said payment terminal and the monitoring facility.

12. The automated payment system according to claim 11, wherein said two-way video and audio communication system includes an IP-addressable video camera.

13. The automated payment system according to claim 11, further comprising:
    a processor operable to control said apparatus for calculating the payment amount and said apparatus for receiving the payment amount; and a data link between said processor and the monitoring facility to permit remote control of said processor.

* * * * *